(No Model.) 2 Sheets—Sheet 1.

A. W. GITCHELL.
LEAF TURNER.

No. 516,008. Patented Mar. 6, 1894.

Witnesses:
Louis Clark
E. Behel

Inventor
Albert W. Gitchell
By A. O. Behel
Atty.

(No Model.) 2 Sheets—Sheet 2.

A. W. GITCHELL.
LEAF TURNER.

No. 516,008. Patented Mar. 6, 1894.

Witnesses:
Luis Clark
E. Behel

Inventor:
Albert W. Gitchell
By A. O. Behel
Atty.

UNITED STATES PATENT OFFICE.

ALBERT W. GITCHELL, OF ROCKFORD, ILLINOIS.

LEAF-TURNER.

SPECIFICATION forming part of Letters Patent No. 516,008, dated March 6, 1894.

Application filed November 25, 1893. Serial No. 492,014. (No model.)

*To all whom it may concern:*

Be it known that I, ALBERT W. GITCHELL, a citizen of the United States, residing at Rockford, in the county of Winnebago and State of Illinois, have invented certain new and useful Improvements in Leaf-Turners, of which the following is a specification.

The object of this invention is to construct a leaf turner which shall be automatic in its movements, and operation, by suitable spring or weight power, and consists of an arm carrying a device for separating the leaves, a finger for carrying the leaf partially over, a device for completing the movement of the leaf, and a device for holding the leaf after being turned, and a device for regulating the rapidity of the movements, thereby turning the leaves with greater or less rapidity.

Figure 1:
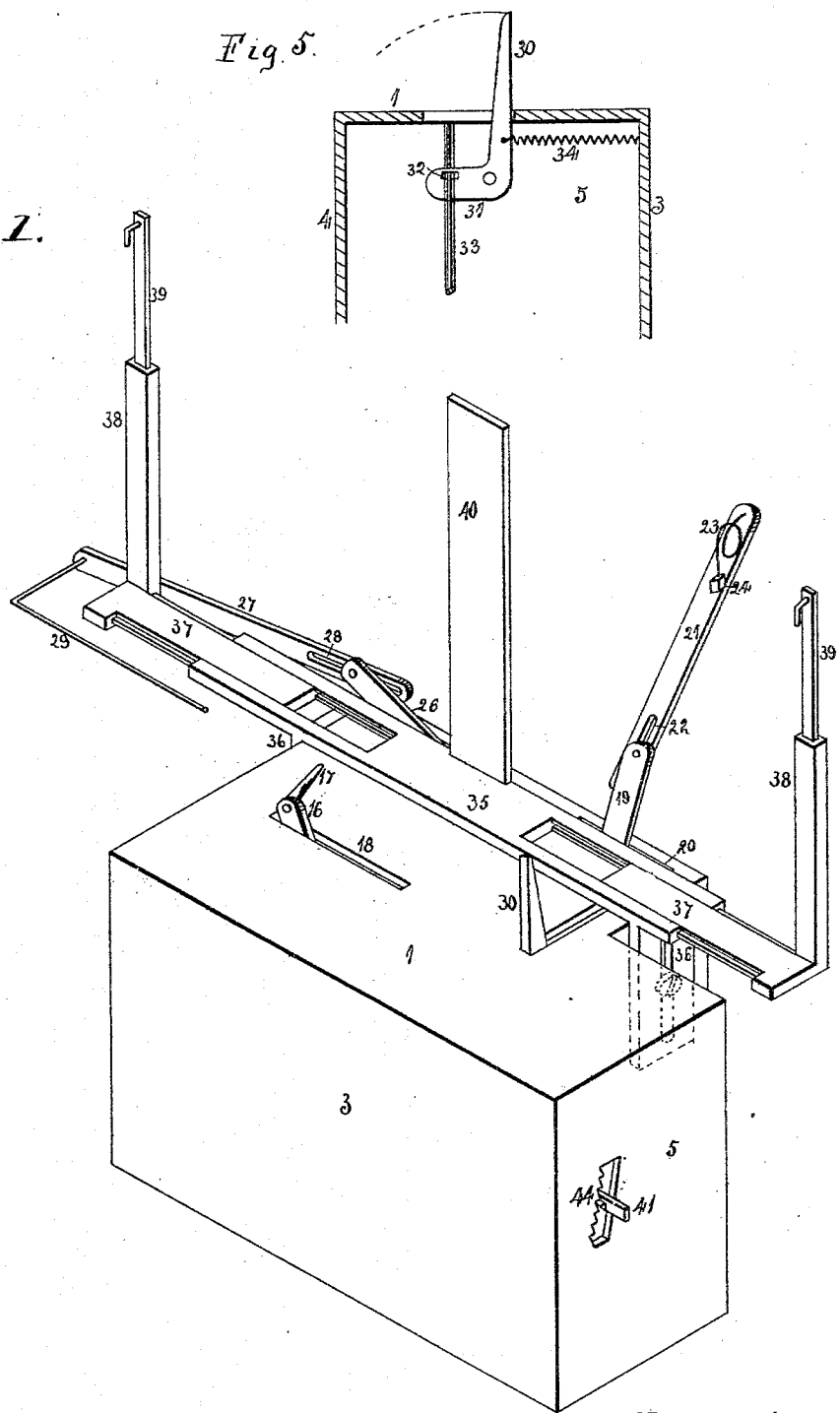
Figure 2:
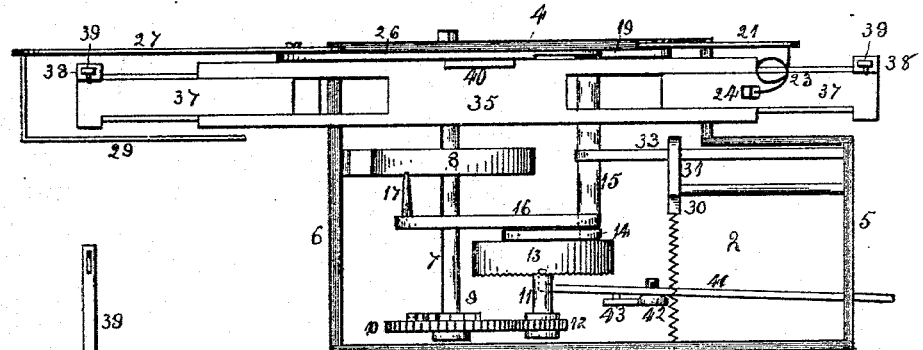
Figure 3:
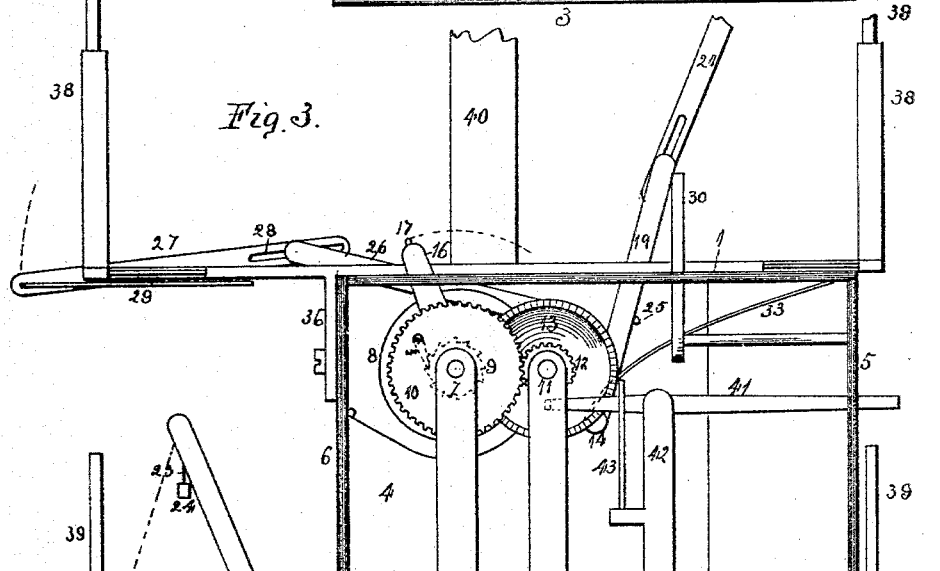
Figure 4:
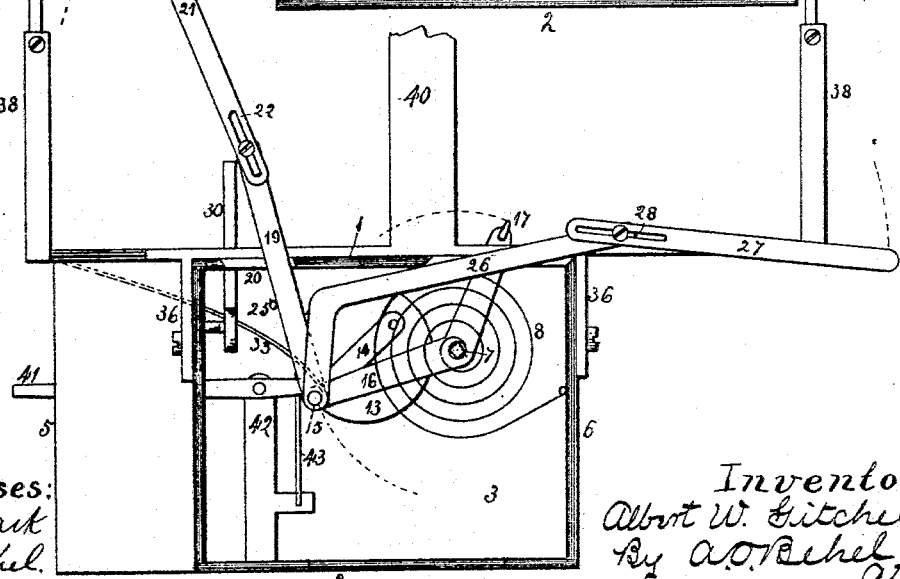

In the accompanying drawings—Figure 1, is an isometrical representation of my improved leaf turner as seen from the front. Fig. 2, is a plan view of the same in which the top of the box containing the operating mechanism has been removed. Fig. 3, is a front elevation in which the face of the box has been removed. Fig. 4, is a rear elevation in which the back of the box has been removed. Fig. 5, is a transverse section showing the device for moving the leaf, the first portion of its movement after being separated. Fig. 6, is an isometrical representation of the concave wheel employed for regulating the speed of the leaf turner.

The box containing the operating mechanism consists of a top 1, bottom 2, front 3, rear 4, and ends 5, and 6, and within which is supported a shaft 7, to which is connected a volute spring 8, its outer end being connected to the end 6, of the box. This shaft also supports a ratchet wheel 9, and loosely mounted thereon is a toothed wheel 10, carrying a spring actuating dog, which engages the teeth of the ratchet wheel, forming what is known as a click, in order that the spring may be wound without running the other parts of the mechanism backward. In suitable bearings is supported a shaft 11, to which is connected a toothed pinion 12, which meshes with the teeth of the toothed wheel 10, and the other end of this shaft 11, supports a concave faced wheel 13, having its outer edge serrated as shown at Fig. 6. To the front face of this wheel is pivoted a link 14, some distance from the center of the wheel, and from the lower end of this link extends an arm 15, which has a pivotal connection with the link; an arm 16, is supported by the main driving shaft 7, and also by the arm 15, connected to the swinging link. The upper end of this arm 16, extends through the top of the box and supports a pointed bar 17, at right angles thereto.

Thus far as described it will be seen that the power of the volute spring will turn the main shaft, which in turn will revolve the shaft 11, carrying the wheel 13, thereby imparting movement to the swinging link 14, and the movement of the lower end of the link is regulated by its connection with the arm 16, having a pivotal connection with the main driving shaft; that is the link imparts oscillatory movement to the arm 17, thereby moving its upper end in the arc of a circle and for that purpose a slot 18, is cut through the top of the box.

To the end of the arm 15, extending from the lower end of the link 14, is pivoted a bar 19, for separating the leaves, and which extends through a slot 20, in the top of the box. To the upper end of this arm is secured an extension 21, having its lower end slotted and held in place by a screw passing through the slot 22, into the upper end of the bar 19, the free upper end of this extension carries a coil spring 23, to the end of which is connected a block of rubber 24, as the lower end of the link moves in an arc of a circle struck from the center of the main driving shaft, and as the bar 19, is connected to the arm extending from the lower end of the link, the lower end of this arm will also move in the same arc its upper end guided by a pin 25, extending from the back of the box thereby imparting a reciprocating movement to the bar in its lengthwise direction.

A device for holding the leaves in position after being turned is also operated by the arm 15, extending from the lower end of the swinging link 14, and consists of an arm 26, its lower end having a pivotal connection with the arm 15, its upper end extending through a slot formed in the top of the box; to the upper end of this arm is secured an extension 27, provided with a lengthwise slot 28, and held together by a screw in order that the extension may be adjusted in its lengthwise direction. From the front of this extension extends a wire 29, a suitable distance, then extending in the lengthwise direction of the extension. At the lower end the bar 26, carrying the extension, has a pivotal connection with the arm 15, extending from the lower end of the swinging link, and as the lower end of this link moves in the arc of a circle, the bar 26, will have a rocking movement, the end of the slot through the top of the box being the fulcrum and this rocking movement will impart a vertical oscillatory movement to the free end of the extension 27, carrying the bent wire 29, with it.

The device for partially turning the leaf at the beginning of its movement, consists of a finger 30, having a pivotal connection with a support extending from the end 5, of the box. Near the pivot of this arm extends a portion 31, provided with an opening 32, a wire 33, extends through this opening and is rigidly connected with the arm 15, extending from the lower end of the swinging link, and during the downward swinging movement of the lower end of the link, this wire will press upon the extension 31 of the finger 30, rocking it upon its pivotal support toward the back of the box, transversely to the length thereof, and upon the return movement of the swinging link, a spring 34, having a connection with this finger, and with the front of the box, will return the finger to its original position.

To the box is connected a support for the book, and consists of a horizontal base 35, having two end arms 36, which are provided with a slot in the lengthwise direction, and a screw passing through the slot into the end of the box holds the base in connection therewith, and permitting of its vertical adjustment. The ends of this base are provided with grooved guideways within which are located extensions 37, from the upper rear face of which rise uprights 38, forming supports for the edges or outer ends of the book when in its open position, and these uprights are provided with an extension 39, having a hook at the upper ends which engages the cover of the book, holding the book open. From the center of the base 35, rises a support 40, against which the center of the book rests.

Thus far I have described the construction of the various parts for automatically turning the leaves of books, and their operation will now be explained. The book is placed in its open position upon its support, and the covers are held by the hooks at the upper ends of the bars 39. The spring is wound and upon being released will impart a rotary movement to its shaft, and through the click 9, a rotary movement will be imparted to the wheel 13, carrying the swinging link, and as described a reciprocating movement will be imparted to the extension 21, carrying the rubber block 24, before the liberation of the spring, this rubber block had been placed in contact with the leaf to be turned, and the reciprocating movement imparted to the extension 21, will impart a lengthwise movement to the rubber block, thereby pressing downward upon the leaf, separating it from the remaining leaves, and during this movement the finger 30, will have moved toward the rear of the box, behind the leaf operated upon, and upon the return movement of the finger 30, it will carry the leaf toward the left, a suitable distance to enable the pointed bar 17, to engage it upon its rear face, which will, upon its oscillatory movement upon the main driving shaft, carry the leaf over against the left cover of the book, and when thus placed, a vertical movement will be imparted to the bent wire 29, which will engage the turned leaf some distance from its lower edge, thereby holding it until a new leaf is presented, when it will descend along the new leaf to be placed in position. It will be noticed that these various movements will impart to the leaf to be turned the same movements that the hand would do, and are so timed that the turning of the leaf will be without any jerking movement. In order that the movements of these various parts may be under control, I have constructed a device for regulating the speed at which the shaft 11, carrying the wheel 13, revolves, and consists of an arm 41, having a pivotal connection with the support 42, and extending through the end 5, of the box, its inner end engaging the concave face of the wheel 13, between the inner end of this arm and its support 42, is located a spring 43 which presses against the arm, holding it in contact with the concave face of the wheel. Upon this end of the arm being moved to or from the center of the wheel, more or less friction will be imparted to the wheel, which must be overcome by the spring force and when it is desired to stop the device, the end of the lever is brought in contact with the serrations in the face of the wheel. The end of the lever extending through the end of the box is made adjustable by means of the notches 44, so that the required friction may be applied to the wheel in order that it may rotate at a certain speed.

I claim as my invention—

1. In a leaf turner, the combination of a book support made adjustable as to width, a leaf separator made adjustable in the direction of its length, a leaf carrying device, and a leaf holder made adjustable in the direction of its length.

2. In a leaf turner, the combination of devices for separating and turning a leaf, suitable power for automatically imparting movement to the devices, mechanism for regulating the speed of the power consisting of a concave faced wheel having a serrated rim, and a spring actuated lever capable of engaging the concave face and serrations, movable to and from the center of the wheel.

3. In a leaf turner, the combination of a reciprocating separator, an oscillatory leaf carrying device, an oscillating leaf holder, having a connection with suitable driving power.

ALBERT W. GITCHELL.

Witnesses:
E. BEHEL,
A. O. BEHEL.